United States Patent [19]

Lang

[11] 4,255,739

[45] Mar. 10, 1981

[54] DEVICE FOR THE INDICATION OF DIFFERENT OPERATING CONDITIONS OF MOTOR VEHICLES

[75] Inventor: Wilhelm-Ludwig Lang, Altheim, Fed. Rep. of Germany

[73] Assignee: VDO Adolf Schindling AG, Frankfurt am Main, Fed. Rep. of Germany

[21] Appl. No.: 53,600

[22] Filed: Jun. 29, 1979

[30] Foreign Application Priority Data

Jul. 3, 1978 [DE] Fed. Rep. of Germany ....... 2829126

[51] Int. Cl.³ .............................................. B60Q 1/00
[52] U.S. Cl. ............................ 340/52 F; 340/366 G; 340/378.4
[58] Field of Search ............... 340/52 D, 52 F, 366 R, 340/366 E, 366 G, 378.3, 378.4, 380, 381, 383

[56] References Cited

U.S. PATENT DOCUMENTS

| | | | |
|---|---|---|---|
| 2,749,541 | 6/1956 | Whittlesey | 340/381 |
| 3,618,078 | 11/1971 | Whittman | 340/381 |
| 3,969,721 | 7/1976 | Chadwick et al. | 340/366 E |

*Primary Examiner*—Alvin H. Waring
*Attorney, Agent, or Firm*—Martin A. Farber

[57] ABSTRACT

Device for the indication of different operating conditions of motor vehicles, particularly automobiles, with a number of light sources which are coordinated to the individual operating conditions, a corresponding number of focusing hoods receiving the light sources, the focusing hoods being arranged in a row adjacent to one another, an inspection glass covering the focusing hoods on its end which faces the observer and a strip printed with symbols, which strip is insertable between the focusing hoods and the inspection glass, the strip being translucent to light at least in the area of the symbols, and means for pressing the strip on the front sides of the focusing hoods. Elevations projecting against the inspection glass are engraved into the strip.

8 Claims, 7 Drawing Figures

DEVICE FOR THE INDICATION OF DIFFERENT OPERATING CONDITIONS OF MOTOR VEHICLES

The invention relates to a device for the indication of different operating conditions of motor vehicles, particularly automobiles, with a number of light sources which are coordinated to the individual operating conditions, a corresponding number of focusing hoods receiving the light sources, the focusing hoods being arranged in a row adjacent to one another, an inspection glass covering the focusing hoods on its end which faces the observer and a strip printed with symbols, which strip is insertable between the focusing hoods and the inspection glass, the strip being translucent to light at least in the area of the symbols, and means for pressing the strip on the front sides of the focusing hoods.

Devices of this type are already known and are found particularly in so-called combi-instruments (combination instruments) of motor vehicles where they are used for indication of impermissible values or undue information, for example of the oil temperature, the oil quantity or the brake lining, but also for the indication of the operation of certain systems, such as the traveling direction indicator, the warning blinking system, the exterior lights and the like. The individual focusing hoods with the incandescent lamps which are coordinated to the hoods are frequently arranged in a horizontal row in the upper or lower part of the combination instruments, whereas in the central part of the combination instrument the tachometer or rpm speed counter or a clock or analog cooling temperature—and tank content—indicators are provided.

With the known devices of this type the strip is formed flat, zig-zag shaped, whereby it is achieved that substantial parts of the strip are pressed against the front sides of the focusing hood and therewith the individual strip sections which carry the symbols are properly illuminated and no light straying or scattering occurs toward the adjacent strip sections. This zig-zag formation of the strip, however, causes the disadvantage of a time consuming mounting. Namely a reason is that during the insertion of the strip between the inspection glass and the front sides of the focusing hood, particular attention is to be taken that the strip does not bend at the zig-zag edges and break off, which also is the case with a small amount of inattention on the part of the person inserting the strip.

This disadvantage is intended to be avoided by the invention. It is consequently a task of the invention to make a device with which the mounting of the strip which carries the symbols can be accomplished quickly and without particular care, without producing a deterioration of the illumination of the individual strip sections and of the light scattering to adjacent sections.

This task is aided in its solution in accordance with the invention in the manner that elevations (11) are embossed or stamped into the strip (7), which elevations project against the inspection glass (3).

By these elevations which are embossed onto the strip, the strip is substantially more resistant to bending, buckling or breaking than is the case with a zig-zag like formation, so that an insertion of the strip between the viewing pane or window shield and the front side of the focusing hood is possible without difficulties. A particular advantage of the invention is that the embossing, pressing or stamping of the elevations can be performed together with the stamping out or punching out of the strip in the same working operation. With the known methods and devices on the contrary an additional working step and a specially heated device must be provided for the zig-zag-like formation of the strip. A further particular advantage of the invention is that by the elevations which project against the viewing glass, the strip is brought into engagement faultlessly on all sections in the front sides of the focusing hoods, whereby a particularly scatter-free and sharp illumination of the individual strip sections occur.

According to one advantageous embodiment of the invention the elevations (11) are arranged along the longitudinal axis of the strip. The embossing of the elevations along the longitudinal edge of the strip leads to an increased insensitivity to bending of the strip, whereby the strip can be shifted or pushed particularly quickly and without problems between the inspection glass and the front sides of the focusing hoods.

According to another advantageous embodiment the elevations (11) are arranged between the individual sections (10) of the strip (7), which sections (10) are provided with the symbols (8). With such an arrangement of the elevations, a particularly good and scatter-free illumination of the individual strip sections can be achieved, while the mounting is minimally less advantageous than with the previously described embodiment. Which of the two embodiment forms is finally to be used, depends on which is desired, a particularly simple or easy mounting of the strip or a particularly good illumination of the same.

Dot or point elevations have proved to be particularly suitable with respect to manufacturing and assembly technique. In special cases ribbed-like elevations can also be advantageous. Finally, there is the possibility of providing dot-shaped as well as ribbed-like shaped elevations on one strip.

With the above and other objects and advantages in view, the present invention will be more clearly understood in connection with the detailed description of a preferred embodiment, when considered with the accompanying drawings, of which FIG. 1 is a front elevational view of a section of a combination instrument;

In a multipurpose instrument (combination instrument) housing, of which merely a cut out section from the lower part is shown, there is located a slot-like recess 2 which is closed with an inspection disc or viewing pane 3. The inspection disc 3 is tiltable-in or snapped-in from the front into the recess 2.

Figure 1:
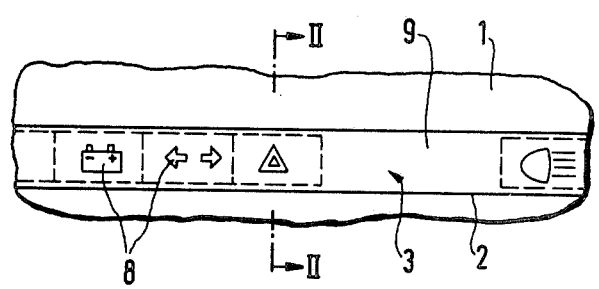
Figure 2:
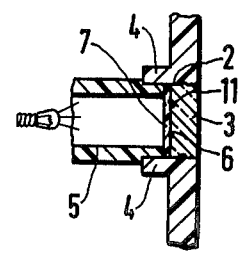
FIG. 2 is a section through the combination instrument taken along the lines II—II of FIG. 1.
Figure 3:
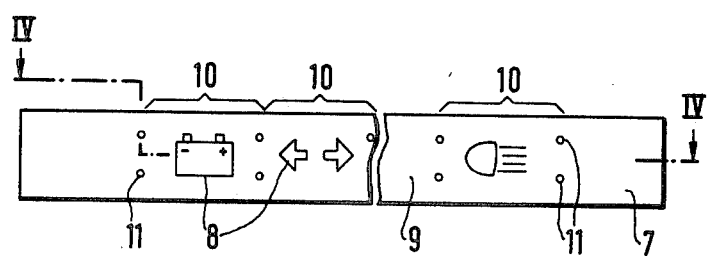
FIG. 3 is a plan view of a strip which carries symbols, the strip being provided with elevations.
Figure 4:
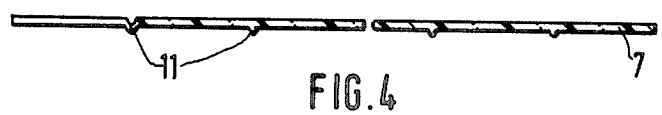
FIG. 4 is a longitudinal section through the strip according to FIG. 3 taken along the lines IV—IV.
Figure 5:
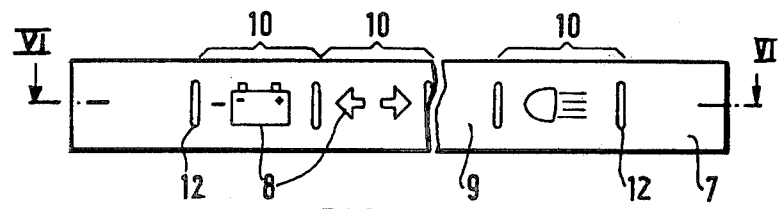
FIG. 5 is a plan view of a symbol strip with rib-shaped elevations.
Figure 6:
FIG. 6 is a section taken along the lines VI—VI of FIG. 5.
Figure 7:
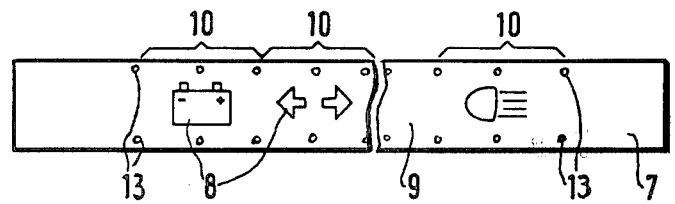
FIG. 7 is a plan view of a symbol strip with elevations along the longitudinal edges of the strip.

The housing 1 on its interior surface on both longitudinal sides of the recess 2 transfers respectively into one attached or formed-on guide ledge 4 each, between which ledges 4, focusing hoods 5, which are rectangular or square in cross section, are insertable in a row adjacent to one another. A translucent plastic or synthetic material strip 7 imprinted with symbols 8 can be pushed or inserted into the gap or slot 6 which remains between the front side of the focusing hoods 5 and the inspection glass 3. In the area 9 in which no active focusing hoods are located, the strip is provided with a coating or covering which is opaque to light. As is particularly evident from FIGS. 3 and 4, in the strip 7 between the individual sections 10 which carry the symbols 8, two point or dot-like elevations 11 are each respectively embossed or stamped in, which elevations 11 in the mounted condition of the strip 7 project against the inspection glass or viewing pane 3. Since the width of the gap is slightly smaller than the thickness of the strip 7 with the elevations 11, the strip 7 in the mounted condition is pressed by the stamped-in elevations 11 against the front side of the focusing hoods 5, with the effect that the individual sections 10 are illuminated fault-free and without light straying in or being scattered in from adjacent light shafts or focusing hoods 5. Instead of two dot-like shaped elevations 11 an oblong or elongated rib-shaped elevation 12 (e.g. FIGS. 5–6) can also be provided. It is also possible to mount or attach such rib-shaped elevations with their longitudinal axis running parallel to the longitudinal edge of the strip in the area of the edge of the strip. This applies in the same manner also to dot-shaped elevations 13 (FIG. 7).

While there have been disclosed several embodiments of the invention it is to be understood that these embodiments are given by example only and not in a limited sense.

I claim:

1. A device for the indication of different operating conditions of motor vehicles, particularly automobiles, comprising a number of light sources which are coordinated to individual operating conditions, a corresponding number of separate focusing hoods receiving the light sources, respectively, the focusing hoods being arranged in a longitudinal row adajcent to one another and having front sides, an inspection glass covering the focusing hoods on the front sides thereof constituting an end which faces the observer, a thin flexible longitudinally elongated strip printed with symbols, the strip being insertable between the focusing hoods and the inspection glass, the strip being in translucent to light at least in the area of the symbols, said strip forming elevations engraved into the strip, said elevations projecting against the inspection glass and constituting means for pressing the strip on the front sides of the focusing hoods.

2. The device as set forth in claim 1, wherein said elevations are arranged along longitudinal edges of said strip.

3. The device as set forth in claim 1, wherein individual sections of said strip are provided with said symbols, said elevations are arranged between said individual sections.

4. The device as set forth in claims 1, 2 or 3, wherein said elevations are rib-shaped.

5. The device as set forth in claims 1, 2 or 3, wherein said elevations are substantially point-shaped.

6. The device as set forth in claim 1, further comprising a housing having an interior surface forming with inwardly projecting guide ledges, said focusing hoods are mounted with said front sides between said guide ledges, said inspection glass is mounted in said housing, aligned with said guide ledges, spaced from said front sides of said focusing hoods by a spacing smaller than the thickness of said strip including and through said elevations, said strip is disposed between said guide ledges in said spacing.

7. The device as set forth in claim 6, wherein said focusing hoods are circular in cross-section.

8. The device as set forth in claim 6, wherein said focusing hoods are rectangular in cross-section.

* * * * *